US005412735A

United States Patent [19]

Engebretson et al.

[11] Patent Number: 5,412,735

[45] Date of Patent: May 2, 1995

[54] ADAPTIVE NOISE REDUCTION CIRCUIT FOR A SOUND REPRODUCTION SYSTEM

[75] Inventors: A. Maynard Engebretson, Ladue, Mo.; Michael P. O'Connell, Somerville, Mass.

[73] Assignee: Central Institute for the Deaf, St. Louis, Mo.

[21] Appl. No.: 842,566

[22] Filed: Feb. 27, 1992

[51] Int. Cl.[6] .......... H04B 15/00

[52] U.S. Cl. .......... 381/94; 381/68.4; 381/18.2

[58] Field of Search .......... 381/68.2, 94, 68.4, 381/68.7, 71

[56] References Cited

U.S. PATENT DOCUMENTS

| | | | |
|---|---|---|---|
| 3,927,279 | 12/1975 | Nakamura et al. | 179/107 |
| 4,433,435 | 2/1984 | David | 381/94 |
| 4,548,082 | 10/1985 | Engebretson | 73/585 |
| 4,658,426 | 4/1987 | Chabries et al. | 381/94 |
| 4,833,719 | 5/1989 | Carne et al. | 381/94 |
| 5,018,202 | 5/1991 | Takahashi et al. | 381/71 |

OTHER PUBLICATIONS

A self-adaptive noise filtering system (about 1987) by D. Graupe, J. Grosspietsch, and R. Taylor.

Adaptive Noise Cancelling: Principles and Applications (Dec., 1975) by B. Widrow, J. Glover, Jr., J. McCool, J. Kaunitz, C. Williams, R. Hearn, J. Zeidler, E. Dong, Jr., R. Goodlin.

Linear prediction: A Tutorial Review (Apr., 1975) by John Makhoul.

A Roundoff Error Analysis of the LMS Adaptive Algorithm (Feb., 1984) by Christos Caraiscos.

*Primary Examiner*—Forester W. Isen

*Assistant Examiner*—Ping W. Lee

*Attorney, Agent, or Firm*—Senniger, Powers, Leavitt & Roedel

[57] ABSTRACT

A noise reduction circuit for a hearing aid having an adaptive filter for producing a signal which estimates the noise components present in an input signal. The circuit includes a second filter for receiving the noise-estimating signal and modifying it as a function of a user's preference or as a function of an expected noise environment. The circuit also includes a gain control for adjusting the magnitude of the modified noise-estimating signal, thereby allowing for the adjustment of the magnitude of the circuit response. The circuit also includes a signal combiner for combining the input signal with the adjusted noise-estimating signal to produce a noise reduced output signal.

39 Claims, 2 Drawing Sheets

ADAPTIVE NOISE REDUCTION CIRCUIT FOR A SOUND REPRODUCTION SYSTEM

This invention was made with U.S. Government support under Veterans Administration Contract V674-P-857 and V674-P-1736 and National Aeronautics and Space Administration (NASA) Research Grant No. NAG10-0040. The U.S. Government has certain rights in this invention.

Copyright ©1988 Central Institute for the Deaf. A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

BACKGROUND OF THE INVENTION

The present invention relates to a noise reduction circuit for a sound reproduction system and, more particularly, to an adaptive noise reduction circuit for a hearing aid.

A common complaint of hearing aid users is their inability to understand speech in a noisy environment. In the past, hearing aid users were limited to listening-in-noise strategies such as adjusting the overall gain via a volume control, adjusting the frequency response, or simply removing the hearing aid. More recent hearing aids have used noise reduction techniques based on, for example, the modification of the low frequency gain in response to noise. Typically, however, these strategies and techniques have not achieved as complete a removal of noise components from the audible range of sounds as desired.

In addition to reducing noise effectively, a practical ear-level hearing aid design must accommodate the power, size and microphone placement limitations dictated by current commercial hearing aid designs. While powerful digital signal processing techniques are available, they require considerable space and power such that most are not suitable for use in a hearing aid. Accordingly, there is a need for a noise reduction circuit that requires modest computational resources, that uses only a single microphone input, that has a large range of responses for different noise inputs, and that allows for the customization of the noise reduction according to a particular user's preferences.

SUMMARY OF THE INVENTION

Among the several objects of the present invention may be noted the provision of a noise reduction circuit which estimates the noise components in an input signal and reduces them; the provision of such a circuit which is small in size and which has minimal power requirements for use in a hearing aid; the provision of such a circuit having a frequency response which is adjustable according to a user's preference; the provision of such a circuit having a frequency response which is adjustable according to an expected noise environment; the provision of such a circuit having a gain which is adjustable according to a user's preference; the provision of such a circuit having a gain which is adjustable according to an existing noise environment; and the provision of such a circuit which produces a noise reduced output signal.

Generally, in one form the invention provides a noise reduction circuit for a sound reproduction system having a microphone for producing an input signal in response to sound in which noise components are present. The circuit includes an adaptive filter comprising a variable filter responsive to the input signal to produce a noise estimating signal and further comprising a first combining means responsive to the input signal and the noise-estimating signal to produce a composite signal. The parameters of the variable filter are varied in response to the composite signal to change its operating characteristics. The circuit further includes a second filter which responds to the noise-estimating signal to produce a modified noise-estimating signal and also includes means for delaying the input signal to produce a delayed signal. The circuit also includes a second combining means which is responsive to the delayed signal and the modified noise-estimating signal to produce a noise-reduced output signal. The variable filter may include means for continually sampling the input signal during predetermined time intervals to produce the noise-estimating signal. The circuit may be used with a digital input signal and may include a delaying means for delaying the input signal by an integer number of samples N to produce the delayed signal and may include a second filter comprising a symmetric FIR filter having a tap length of $2N+1$ samples. The circuit may also include means for adjusting the amplitude of the modified noise-estimating signal.

Another form of the invention is a sound reproduction system having a microphone for producing an input signal in response to sound in which noise components are present and a variable filter which is responsive to the input signal to produce a noise-estimating signal. The system has a first combining means responsive to the input signal and the noise-estimating signal to produce a composite signal. The parameters of the variable filter are varied in response to the composite signal to change its operating characteristics. The system further comprises a second filter which responds responsive to the noise-estimating signal to produce a modified noise-estimating signal and also includes means for delaying the input signal to produce a delayed signal. The system additionally has a second combining means responsive to the delayed signal and the modified noise-estimating signal to produce a noise-reduced output signal and also has a transducer for producing sound with a reduced level of noise components as a function of the noise-reduced output signal. The variable filter may include means for continually sampling the input signal during predetermined time intervals to produce the noise-estimating signal. The system may be used with a digital input signal and may include a delaying means an for delaying the input signal by an integer number of samples N to produce the delayed signal and may include a second filter comprising a symmetric FIR filter having a tap length of $2N+1$ samples. The system may also include means for adjusting the amplitude of the modified noise-estimating signal.

An additional form of the invention is a method of reducing noise components present in an input signal in the audible frequency range which comprises the steps of filtering the input signal with a variable filter to produce a noise-estimating signal and combining the input signal and the noise-estimating signal to produce a composite signal. The method further includes the steps of varying the parameters of the variable filter in response to the composite signal and filtering the noise-estimating signal according to predetermined parameters to produce a modified noise-estimating signal. The method also includes the steps of delaying the input signal to produce a delayed signal and combining the delayed signal and the modified noise-estimating signal to produce a noise-reduced output signal. The method may include a filter parameter varying step comprising the step of continually sampling the input signal and varying the parameters of said variable filter during predetermined time intervals. The method may be used with a digital input signal and may include a delaying step comprising delaying the input signal by an integer number of samples N to produce the delayed signal and may include a noise-estimating signal filtering step comprising filtering the noise-estimating signal with a symmetric FIR filter having a tap length of 2N+1 samples. The method may also include the step of selectively adjusting the amplitude of the modified noise-estimating signal.

Other objects and features will be in part apparent and in part pointed out hereinafter.

DETAILED DESCRIPTION OF A PREFERRED EMBODIMENT

Figure 1:
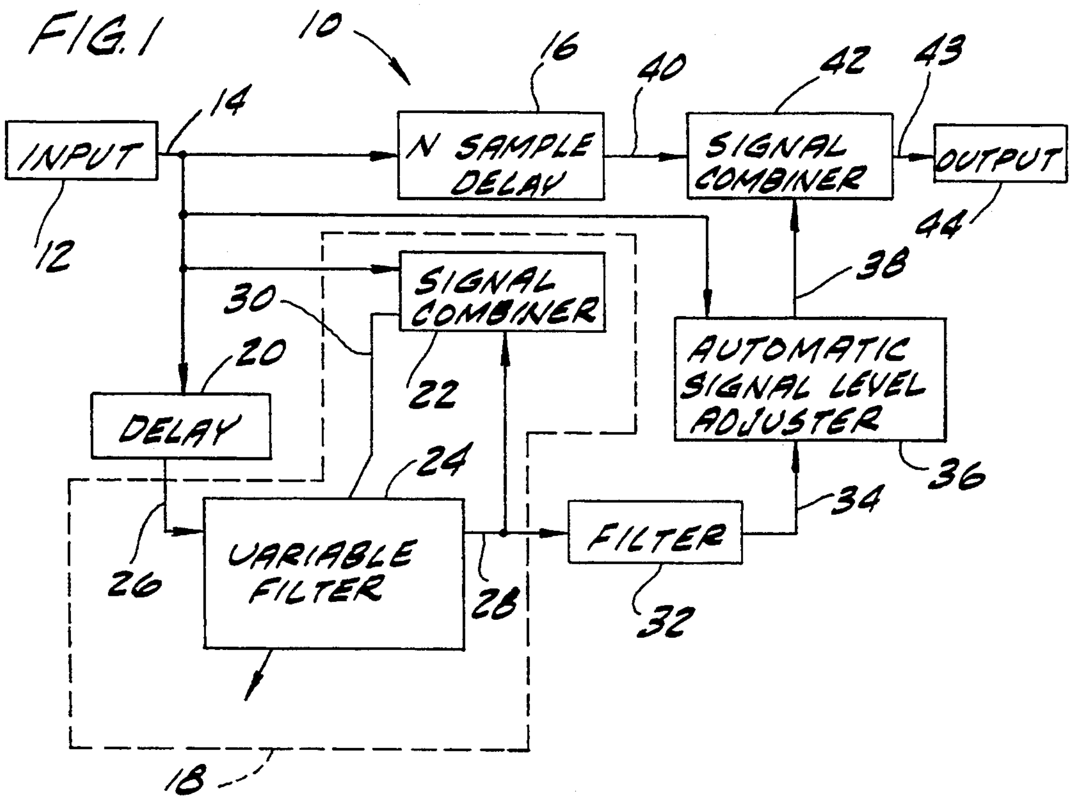
FIG. 1 is a block diagram of a noise reduction circuit of the present invention.

A noise reduction circuit of the present invention as it would be embodied in a hearing aid is generally indicated at reference numeral 10 in FIG. 1. Circuit 10 has an input 12 which may be any conventional source of an input signal such as a microphone, signal processor, or the like. Input 12 also includes an analog to digital converter (not shown) for analog inputs so that the signal transmitted over a line 14 is a digital signal. The input signal on line 14 is received by an N-sample delay circuit 16 for delaying the input signal by an integer number of samples N, an adaptive filter within dashed line 18, a delay 20 and a signal level adjuster 36.

Adaptive filter 18 includes a signal combiner 22, and a variable filter 24. Delay 20 receives the input signal from line 14 and outputs a signal on a line 26 which is similar to the input signal except that it is delayed by a predetermined number of samples. In practice, it has been found that the length of the delay introduced by delay 20 may be set according to a user's preference or in anticipation of an expected noise environment. The delayed signal on line 26 is received by variable filter 24. Variable filter 24 continually samples each data bit in the delayed input signal to produce a noise-estimating signal on a line 28 which is an estimate of the noise components present in the input signal on line 14. Alternatively, if one desires to reduce the signal processing requirements of circuit 10, variable filter 24 may be set to sample only a percentage of the samples in the delayed input signal. Signal combiner 22 receives the input signal from line 14 and receives the noise-estimating signal on line 28. Signal combiner 22 combines the two signals to produce an error signal carried by a line 30. Signal combiner 22 preferably takes the difference between the two signals.

Variable filter 24 receives the error signal on line 30. Variable filter 24 responds to the error signal by varying the filter parameters according to an algorithm. If the product of the error and delayed sample is positive, the filter parameter corresponding to the delayed sample is increased. If this product is negative, the filter parameter is decreased. This is done for each parameter. Variable filter 24 preferably uses a version of the LMS filter algorithm for adjusting the filter parameters in response to the error signal. The LMS filter algorithm is commonly understood by those skilled in the art and is more fully described in Widrow, Glover, McCool, Kaunitz, Williams, Hearn, Ziedler, Dong and Goodlin, *Adaptive Noise Cancelling.: Principles and Applications,* Proceedings of the IEEE, 63(12), 1692–1716 (1975), which is incorporated herein by reference. Those skilled in the art will recognize that other adaptive filters and algorithms could be used within the scope of the invention. The invention preferably embodies the binary version of the LMS algorithm. The binary version is similar to the traditional LMS algorithm with the exception that the binary version uses the sign of the error signal to update the filter parameters instead of the value of the error signal. In operation, variable filter 24 preferably has an adaption time constant on the order of several seconds. This time constant is used so that the output of variable filter 24 is an estimate of the persisting or stationary noise components present in the input signal on line 14. This time constant prevents the system from adapting and cancelling incoming transient signals and speech energy which change many times during the period of one time constant. The time constant is determined by the parameter update rate and parameter update value.

A filter 32 receives tile noise estimating signal from variable filter 24 and produces a modified noise-estimating signal. Filter 32 has preselected filter parameters which may be set as a function of the user's hearing impairment or as a function of an expected noise environment. Filter 32 is used to select the frequencies over which circuit 10 operates to reduce noise. For example, if low frequencies cause trouble for the hearing impaired due to upward spread of masking, filter 32 may allow only the low frequency components of the noise estimating signal to pass. This would allow circuit 10 to remove the noise components through signal combiner 42 in the low frequencies. Likewise, if the user is troubled by higher frequencies, filter 32 may allow only the higher frequency components of the noise-estimating signal to pass which reduces the output via signal combiner 42. In practice, it has been found that there are few absolute rules and that the final setting of the parameters in filter 32 should be determined on the basis of the user's preference.

Figure 2:
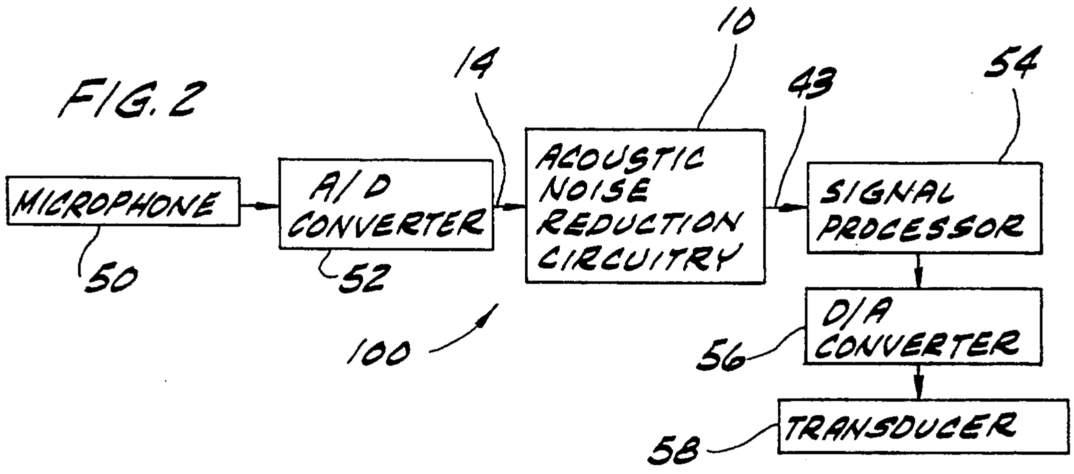
FIG. 2 is a block diagram of a sound reproduction system of the present invention.

When circuit 10 is used in a hearing aid, the parameters of filter 32 are determined according to the user's preferences during tile fitting session for the hearing aid. The hearing aid preferably includes a connector and a data link as shown in FIG. 2 of U.S. Pat. No. 4,548,082 for setting the parameters of filter 32 during the fitting session. The fitting session is preferably conducted as more fully described in U.S. Pat. No. 4,548,082, which is incorporated herein by reference.

Filter 32 outputs the modified noise-estimating signal on a line 34 which is received by a signal level adjuster 36. Signal level adjuster 36 adjusts the amplitude of the modified noise-estimating signal to produce an amplitude adjusted signal on a line 38. If adjuster 36 is manually operated, the user can reduce the amplitude of the modified noise-estimating signal during quiet times when there is less need for circuit 10. Likewise, the user can allow the full modified-noise estimating signal to pass during noisy times. It is also within the scope of the invention to provide for the automatic control of signal level adjuster 36. This is done by having signal level adjuster 36 sense the minimum threshold level of the signal received from input 12 over line 14. When the minimum threshold level is large, it indicates a noisy environment which suggests full output of the modified noise-estimating signal. When the minimum threshold level is small, it indicates a quiet environment which suggests that the modified noise-estimating signal should be reduced. For intermediate conditions, intermediate adjustments are set for signal level adjuster 36.

N-sample delay 16 receives the input signal from input 12 and outputs the signal delayed by N-samples on a line 40. A signal combiner 42 combines the delayed signal on line 40 with the amplitude adjusted signal on line 38 to produce a noise-reduced output signal via line 43 at an output 44. Signal combiner 42 preferably takes the difference between the two signals. This operation of signal combiner 42 cancels signal components that are present both in the N-sample delayed signal and the filtered signal on line 38. The numeric value of N in N-sample delay 16 is determined by the tap length of filter 32, which is a symmetric FIR filter with a delay of N-Samples. For a given tap length L, $L=2N+1$. The use of this equation ensures that proper timing is maintained between the output of N-sample delay 16 and the output of filter 32.

When used in a hearing aid, noise reduction circuit 10 may be connected in series with commonly found filters, amplifiers and signal processors. FIG. 2 shows a block diagram for using circuit 10 of FIG. 1 as the first signal processing stage in a hearing aid 100. Common reference numerals are used in the figures as appropriate. FIG. 2 shows a microphone 50 which is positioned to produce an input signal in response PATENT to sound external to hearing aid 100 by conventional means. An analog to digital converter 52 receives the input signal and converts it to a digital signal. Noise reduction circuit 10 receives the digital signal and reduces the noise components in it as more fully described in FIG. 1 and the accompanying text. A signal processor 54 receives the noise reduced output signal from circuit 10. Signal processor 54 may be any one or more of the commonly available signal processing circuits available for processing digital signals in hearing aids. For example, signal processor 54 may include the filter-limit-filter structure disclosed in U.S. Pat. No. 4,548,082. Signal processor 54 may also include any combination of the other commonly found amplifier or filter stages available for use in a hearing aid. After the digital signal has passed through the final stage of signal processing, a digital to analog converter 56 converts the signal to an analog signal for use by a transducer 58 in producing sound as a function of the noise reduced signal.

Figure 3:
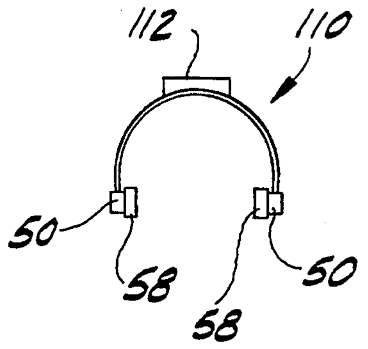
FIG. 3 illustrates the present invention embodied in a headset.

In addition to use in a traditional hearing aid, the present invention may be used in other applications requiring the removal of stationary noise components from a signal. For example, the work environment in a factory may include background noise such as fan or motor noise. FIG. 3 shows circuit 10 of FIG. 1 installed in a headset 110 to be worn over the ears by a worker or in the worker's helmet for reducing the fan or motor noise. Headset 110 includes a microphone 50 for detecting sound in the work place. Microphone 50 is connected by wires (not shown) to a circuit 112. Circuit 112 includes the analog to digital converter 52, noise reduction circuit 10 and digital to analog converter 56 of FIG. 2. Circuit 112 thereby reduces the noise components present in the signal produced by microphone 50. Those skilled in the art will recognize that circuit 112 may also include other signal processing as that found in signal processor 54 of FIG. 2. Headset 110 also includes a transducer 58 for producing sound as a function of the noise reduced signal produced by circuit 112.

Figure 4:
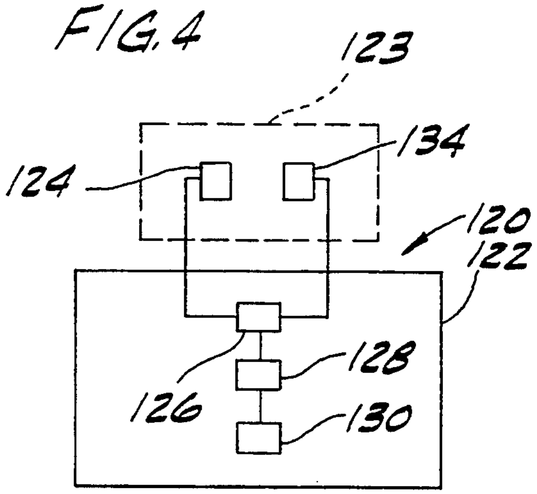
FIG. 4 illustrates a hardware implementation of the block diagram of FIG. 2.

FIG. 4 shows a hardware implementation 120 of an embodiment of the invention and, in particular, it shows an implementation of the block diagram of FIG. 2, but simplified to unity gain function with the omission of signal processor 54. Hardware 120 includes a digital signal processing board 122 comprised of a TMS 32040 14-bit analog to digital and digital to analog converter 126, a TMS 32010 digital signal processor 128, and an EPROM and RAM memory 130, which operates in real time at a sampling rate of 12.5 khz. Component 126 combines the functions of converters 52 and 56 of FIG. 2 while 128 is a digital signal processor that executes the program in EPROM program memory 130 to provide the noise reduction functions of the noise reduction circuitry 10. Hardware 120 includes an ear module 123 for inputting and outputting acoustic signals. Ear module 123 preferably comprises a Knowles EK 3024 microphone and preamplifier 124 and a Knowles ED 1932 receiver 134 packaged in a typical behind the ear hearing aid case. Thus microphone and preamplifier 124 and receiver 134 provide the functions of microphone 50 and transducer 58 of FIG. 2.

Circuit 130 includes EPROM program memory for implementing the noise reduction circuit 10 of FIG. 1 through computer program "NRDEF.320" which is set forth in Appendix A hereto and incorporated herein by reference. The NRDEF.320 program preferably uses linear arithmetic and linear adaptive coefficient quantization in processing the input signal. Control of the processing is accomplished using the serial port communication routines installed in the program.

In operation, the NRDEF.320 program implements noise reduction circuit 10 of FIG. 1 in software. The reference characters used in FIG. 1 are repeated in the following description of FIG. 4 to correlate the block from FIG. 1 with the corresponding software routine in the NRDEF.320 program which implements the block. Accordingly, the NRDEF.320 program implements a 6 tap variable filter 24 with a single delay 20 in the variable filter path. Variable filter 24 is driven by the error signal generated by subtracting the variable filter output from the input signal. Based on the signs of the error signal and corresponding data value, the coefficient of variable filter 24 to be updated is incremented or decremented by a single least significant bit. The error signal is used only to update the coefficients of variable filter 24, and is not used in further processing. The noise estimate output from the variable filter 24 is low pass filtered by an 11 tap linear phase filter 32. This lowpass filtered noise estimate is then scaled by a multiplier (default=1) and subtracted from the input signal delayed 5 samples to produce a noise-reduced output signal.

Figure 5:
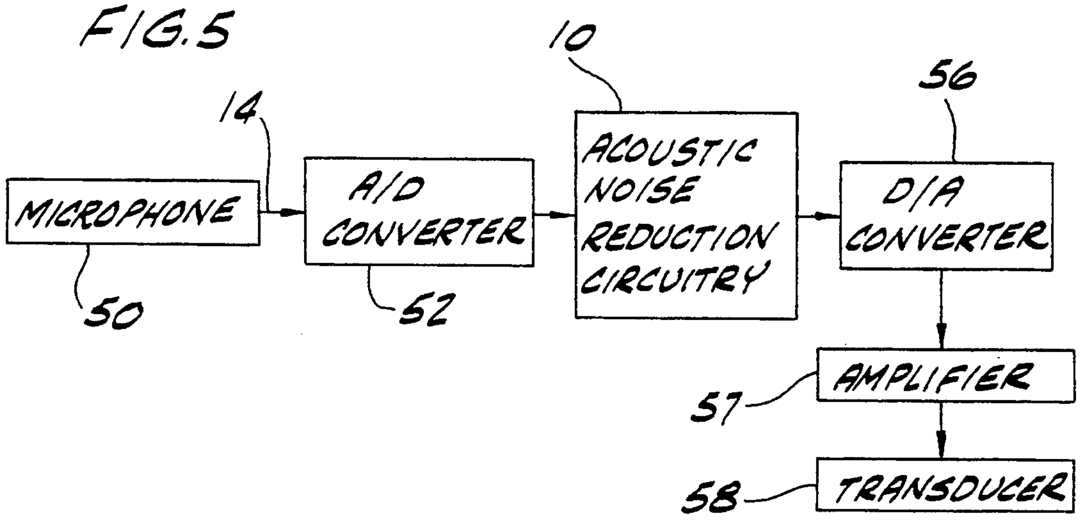
FIG. 5 is a block diagram of an analog hearing aid adopted for use with the present invention.

FIG. 5 illustrates the use of the present invention with a traditional analog hearing aid. FIG. 5 includes an analog to digital converter 52, an acoustic noise reduction circuit 10, and a digital to analog converter 56, all as described above. Circuit 10 and converters 52 and 56 are preferably mounted in an integrated circuit chipset by conventional means for connection,between a microphone 50 and an amplifier 57 in the hearing aid.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

APPENDIX A

```
>
*               PROGRAM         'nrdef.320'
*
*       Michael P. O'Connell
*
*       Copyright 1988
*       Central Institute for the Deaf
*       818 S. Euclid
*       Saint Louis, Misssouri  63110
*
*
*       This program is based on the 50 tap adaptive filter program 'nr
*       In this program the noise estimate is low passed filtered with
*       X tap linear phase lowpass filter, scaled and used to cancel an
*       appropriately delayed input signal.  The error term used in the
*       adaptive filter update remains the same.  The coefficient updat
*       uses a leaky coefficient form such that:
*
*               w(k,n+1) = w(k,n)*[1-leak] + delta
*
*       where leak and delta are programmable.
*
*       This program also includes the serial port communication protoc
*       allow the program parameters to be adjusted through the serial
*       communication port.
*
*       The dc offset from the input is removed using and adaptive null
*       which subtracts an offset from the input to generate a zero mea
*       input stream.
*
*       50 tap adaptive filter using the sign-update method
*
*       This program implements a 50 tap (or smaller) adaptive filter u
*       the sign bit update method.  The program is designed to use the
*       32010 DSP board with the AIC acting as both A/D and D/A.
*
*
*
*       The adaptive structure implemented is
*                                                          +
*       x(n) ----+---------------------------------------->+ ---------+----> err
*                |                                         ^ -        |
*                |                                  /      |          |
*                |      +------+    +-------------+        |          |
*                |      |  -1  |    |             |        |          |
*                +------| Z    |----|    W(*)     |--------+ y(n)     |
*                       |      |    |             |                   |
*                       +------+    +-------------+                   |
*                                        /                            |
*                                         ----------------------------+
*
*       The output signal is
```

```
*
*
*
*                                          +------+                    +
*      x(n) -------------------------------|  -5  |--------------------->+-----> output
*                                          |  Z   |                     -
*                                          |      |                     |
*                                          +------+                     |
*                          +------------+                               |
*                          |            |                               |
*      y(n) -------|  11 tap FIR |--------------->X---------------+
*                          |            |                  -
*                          +------------+                  |
*                                                          |
*                                                     sensitivity
*
*************************************************************************
*
*      The default conditions for this program are:
*
*      - 6 tap adaptive filter
*      - non-leaking coefficients
*      - 1 LSB update of adaptive coefficients
*      - unity sensitivity term ( 32767 where 32768 is unity)
*
*************************************************************************
*
*      DATA AREAS
*
*      page 0
*
*      0 - 50 input samples
*      51 - 100  adaptive filter coefficients
*
*      page 1
*
*      0 - 11 noise estimate samples
*
*************************************************************************
*
*      page 0 data locations
*
d0      equ     0       input data x(n)
d5      equ     5       input data x(n-5)
d49     equ     49      input data x(n-49)
d50     equ     50      input data x(n-50
*
w0      equ     51      adaptive FIR coefficient w(0)
w49     equ     100     adaptive FIR coefficient w(49)
*
y       equ     101     adaptive filter output (estimate)
err     equ     102     estimate error [ err = x(n) - y(n)]
*
temp    equ     103     temporary working location
delta   equ     104     coefficient update magnitude / 2
*
lpest   equ     105     low pass filtered noise estimate
sens    equ     106     noise reduction sensitivity term
*
dcoff   equ     107     adaptive dc offset nulling term
*
taps    equ     108     number of adaptive filter taps - 1
*
leak    equ     109     leaky coefficient multiplier
*
*       serial communication locations
```

```
*
serin   equ     118               serial input data from uart
serout  equ     119               serial output data to uart
value   equ     120               hex value of valid input
cadd    equ     121               address from serial port communication
cdata   equ     122               data from serial port communication
word    equ     123               working location used in building a wor
*
one     equ     124     data memory address containing 1
mask    equ     125     data memory address of 14 high order bit mask
din     equ     126     a/d input sample
dout    equ     127     d/a output sample
*
*       page 1 data locations
*
y0      equ     0       current noise estimate y(n)
y10     equ     10      noise estimate y(n-10)
*
*
*       AORG    0
        b       start   hard reset vector
*
*       AIC interrupt routine
*
sint    in      din,0   read a/d input sample
        out     dout,0  output d/a sample
        pop             load return address into accumulator
        add     one,1   add offset to return address
        push            store new return address
        eint            enable interrupts and clear intf
        ret             return from interrupt call
*
*
bmask   data    >fffc   output bit mask
fsrta   data    >0c18   ra/ta data for 12.25 kHz sampling
fsrtb   data    >448a   rb/tb data for 12.25 kHz sampling
ksens   data    32767   default noise reduction sensitivity
*
*
*       Program initialization
*
start   dint            disable interrupts from AIC
        ldpk    0       load data page pointer to page 0
        sovm            set overflow clipping mode
        lack    ksens   default noise reduction sensitivity
        tblr    sens    read noise reduction sensitivity
        lack    2       load coefficient delta value
        sacl    delta   store coefficient delta value
        lack    5       load number of taps - 1
        sacl    taps    store the desired number of taps - 1
        lack    >0      default coefficient leak term [1 - leak/2^16]
        sacl    leak    store default leak term
*
*
*       clear coefficients and data areas
*       (start at cldat to clear filter taps without resetting
*       model parameters)
*
*
cldat   larp    0       use aux reg. 0
        lark    0,100   set word counter to 100
        zac             clear accumulator
cld     sacl    *       clear lower 100 data locations
        banz    cld     branch until all locations clear
*
        lark    0,50    initialize AR0 to 50
```

```
        lark    1,0     initialize AR1 to 0
*
*
*       start point for resetting parameters
*       (this does not set delta, sens, or the number of taps)
*       (does not clear filter taps)
*
start1  dint            disable interrupts from AIC
        ldpk    0       load data page pointer to page 0
        sovm            set overflow clipping mode
        lack    bmask   output bit mask
        tblr    mask    read bit mask
        lack    1       load one (1) in accumulator
        sacl    one     store value of 1 in one
*
*       This code is used to set the sampling rate and AIC configuratic
*
        zac             clear accumulator
        sacl    dout    zero output data to AIC
        out     dout,0  clear AIC serial register
        out     dout,7  reset AIC
        out     dout,7  reset AIC
        out     dout,0  clear AIC serial register
*
        eint            enable interrupts
*
h1      b       h1      ignore first interrupt
*
        lack    3       data to initiate secondary communication
        sacl    dout    store data in interrupt region
c0      b       c0      wait for interrupt
        lack    fsrta   ta/ra settings
        tblr    dout    read ta/ra settings
c1      b       c1      wait for interrupt
        lack    3       data to initiate secondary communication
        sacl    dout    store data in interrupt region
c2      b       c2      wait for interrupt
        lack    fsrtb   tb/rb settings
        tblr    dout    read tb/rb settings
c3      b       c3      wait for interrupt
        lack    3       data to initiate secondary communication
        sacl    dout    store data in interrupt region
c4      b       c4      wait for interrupt
        lack    >63     AIC data for no aa / 3V FS / in+ input
        sacl    dout    store AIC settings
c5      b       c5      wait for interrupt
        zac             clear accumulator
        sacl    dout    store output sample of 0
c6      b       c6      wait for interrupt
*
*
*
*       This is the region in which the main program sampling loop is
*       executed.
*
*
*       null the input dc offset
*
loop    lac     din,12  load new input sample
        sub     dcoff,3 subtract dc offset
        sacn    din,4   store input with dc term nulled
        bgz     incoff  branch if offset input signal positive
*
        lac     dcoff   load adaptive dc offset term
        sub     one     reduce offset term
        sacl    dcoff   store new offset
```

```
       b         filter   barch to adaptive filter code
*
incoff lac       dcoff    load adaptive dc offset term
       add       one      increase offset term
       sacl      dcoff    store new offset
*
*      calculate the adaptive filter output
*
filter zac                clear accumulator
       lt        d49      load x(n-49) into T register
       mpy       w49      P reg. = x(n-49)*w(49)
       ltd       48       load x(n-48) in T reg., accumulate, Z**-1
       mpy       99       P reg. = x(n-48)*w(48)
       ltd       47
       mpy       98
       ltd       46
       mpy       97
       ltd       45
       mpy       96
       ltd       44
       mpy       95
       ltd       43
       mpy       94
       ltd       42
       mpy       93
       ltd       41
       mpy       92
       ltd       40
       mpy       91
       ltd       39
       mpy       90
       ltd       38
       mpy       89
       ltd       37
       mpy       88
       ltd       36
       mpy       87
       ltd       35
       mpy       86
       ltd       34
       mpy       85
       ltd       33
       mpy       84
       ltd       32
       mpy       83
       ltd       31
       mpy       82
       ltd       30
       mpy       81
       ltd       29
       mpy       80
       ltd       28
       mpy       79
       ltd       27
       mpy       78
       ltd       26
       mpy       77
       ltd       25
       mpy       76
       ltd       24
       mpy       75
       ltd       23
       mpy       74
       ltd       22
       mpy       73
       ltd       21
```

```
mpy     72
ltd     20
mpy     71
ltd     19
mpy     70
ltd     18
mpy     69
ltd     17
mpy     68
ltd     16
mpy     67
ltd     15
mpy     66
ltd     14
mpy     65
ltd     13
mpy     64
ltd     12
mpy     63
ltd     11
mpy     62
ltd     10
mpy     61
ltd     9
mpy     60
ltd     8
mpy     59
ltd     7
mpy     58
ltd     6
mpy     57
ltd     5
mpy     56
ltd     4
mpy     55
ltd     3
mpy     54
ltd     2
mpy     53
ltd     1
mpy     52
ltd     d0        load t reg. x(n), accumulate, Z**-1
mpy     w0        P reg. = x(n)*w(n)
apac              accumulate final product
sach    y,1       store estimate y(n)
add     y,15      add result for gain of 6 dB
add     one,14    round result
sach    y,1       store estimate + 6 dB (prevent overflow in filt
*
*       calculate estimate error (assume delay of one)
*
lac     din       load current input x(n+1)
sacl    d0        store new input sample in array
sub     y         subtract estimate err = x(n+1) - y(n)
sacl    err       store error
*
*       update a single filter coefficient using the sign bit method
*
*                 -AR0 counts from 50 to 1, w(k) to be updated has addres
*                  <AR0> + 50,  applicable data x(n-k) has address <AR0>
*
sar     0,temp    store x(n-k) pointer in location temp
lack    50        load w(k) offset in accmulator
add     temp      add coefficient pointer value
sacl    temp      store w(k) coefficient address in temp
lar     1,temp    load w(k) address in AR1
```

```
*
        lt      *,1      load x(n-k) in to T register, set ARP=1
        mpy     err      err * x(n-k) in P reg.
        pac              load accumulator with product
        blz     nprd     branch if err * x(n-k) is negative
*
*       add delta to w(k)
*
        lac     delta,15         coefficient delta in accumulator
        b       updat    branch to update code
*
*       subtract delta from w(k)
*
nprd    zac              clear accumulator
        sub     delta,15         negative coefficient delta in accumulat
*
*       update w(k) using address stored in AR1
*
updat   add     *,15     add w(k) to current delta
        add     *,15     add w(k) again to make use of overflow processi
        lt      *        load w(k) in T reg. for leak term
        mpy     leak     multiply by leak term
        spac             subtract scaled w(k) for leak
        sach    *,0,0    store updated w(k), set ARP=0
*
*
*       update the coefficient pointer AR0
*
        mar     *-,0     subtract one from AR0 to offset count (49-0)
        banz    cntok    branch if coefficient counter not zero
        lar     0,taps   reset coefficient counter
cntok   mar     *+,0     add one to AR0 to use again as address pointer
*
*       low pass filter and scale the noise estimate
*
        lac     y        load current noise estimate in accumlator
        ldpk    1        change to data page 1
        sacl    y0       store current noise estimate in page 1
*
*       lowpass filter ( 1 kHZ BW, -40 dB at 3kHz)
*
        zac              clear accumulator
        lt      y10      load y(n-10) in T register
        mpyk    -59      multiply by h(10)
        ltd     9        load y(n-9) in T register, accumulate, Z**-1
        mpyk    -68      multiply by h(9)
        ltd     8
        mpyk    113
        ltd     7
        mpyk    545
        ltd     6
        mpyk    1036
        ltd     5
        mpyk    1255
        ltd     4
        mpyk    1036
        ltd     3
        mpyk    545
        ltd     2
        mpyk    113
        ltd     1
        mpyk    -68
        ltd     y0       load y(n) in T register, accumulate, Z**-1
        mpyk    -59      multiply by h(0)
        apac             accumulate last product
        ldpk    0        return to data page 0
```

```
*
        sach    lpest,4 store lowpass estimate of noise
        lt      lpest   lowpass noise estimate in T register
        mpy     sens    multiply by noise reduction sensitivity
        pac             accumulate result
        sach    lpest,1 store filtered, scaled, noise estimate
*
*
*       output desired data
*
dac     lac     d5      load x(n-5) into lower accumulator
        sub     lpest   subtract lowpass, scaled noise estimate
        and     mask    mask off 14 high order bits
        sacl    dout    store output data
*
*
wait    b       wait    wait for interrupt
        bioz    loop    continue loop if no serial input present
*
*
*
*       program gencom.320
*
*               This program contains routines for communication via ar
*       RS232 line and the TMS32010 board.  It contains routines to rea
*       and write to the data and program memory, and begin execution c
*       the 32010 code at a given location.
*
*
*       The command formats are as follows:
*
*       /0xxxx                     start execution at address xxxx
*       /1xxxxddddcccc...          write data to program memory starting
*                                  at address xxxx
*       /2xxxx (XXXX returned)     read data from program memory address x
*       /3xxxxddddcccc...          write data to data memory starting at
*                                  address xxxx
*       /4xxxx (XXXX returned)     read data from data memory address xxxx
*       /5xxxx                     write data xxxx to WDEA interface
*       /6     (XXXX returned)     read data XXXX from WDEA interface
*       /7     (XXXX returned)     read WDEA serial output line,
*                                  0000 if low, 0001 if high
*
*
*
*
*       communication routines for the log DEA evaluation system
*
*       At this point a character has been received through the serial
*       interrupting program execution. The subroutine used to service
*       serial port will be called.  If program control returns to this
*       from 'getch' a character other than '/' has been received.  Fur
*       program execution will halt until a valid character has been re
*
charin  dint                       disable AIC interrupts
        call    getch              call character input routine
        b       charin             wait for valid '/' character
*
*       This portion begins the command interpretation portion of the p
*       Program control passes to this point whenever an '/' character
*       received.
*
comman  call    getch              get command character
        lac     value              load received command value
        bz      exec               branch to execute routine
        sub     one                check for 1 command
```

```
        bz      lpm             branch to load program memory
        sub     one             check for 2 command
        bz      rpm             branch to read program memory
        sub     one             check for 3 command
        bz      ldm             branch to load data memory routine
        sub     one             check for 4 command
        bz      rdm             branch to read data memory routine
        sub     one             check for 5 command
        bz      wwdha           branch to write wdha routine
        sub     one             check for 6 command
        bz      rwdha           branch to read wdha routine
        sub     one             check for 7 command
        bz      cwdha           branch to check wdha serial output bit
        b       charin          branch to get valid control sequence
*
*
*       execute routine
*
exec    call    gword           call word input routine to get address
        lac     word            load starting address
        cala                    jump to desired starting location
*
*
*       load program memory routine
*
lpm     call    gword           call word input routine to get address
        lac     word            load new word
        sacl    cadd            store command address
lpm1    call    gword           call word input to get data
        lac     word            load new word
        sacl    cdata           store command data
        lac     cadd            load write address
        tblw    cdata           write data
        add     one             increment address
        sacl    cadd            store new address
        b       lpm1            branch for new word
*
*
*       read program memory routine
*
rpm     call    gword           call word input routine to get address
        lac     word            load address in accumulator
        tblr    word            read memory contents
        call    sword           send word to host
        b       charin          read next command
*
*
*       load data memory routine
*
ldm     call    gword           call word input routine to get address
        lac     word            load address in accumulator
        sacl    cadd            store starting address for write to mem
ldm1    call    gword           call word input to get data
        lac     word            load data into accumulator
        larp    1               select aux register 1
        lar     1,cadd          load progam memory address in aux reg.
        sacl    *+              store new data increment, increment add
        sar     1,cadd          store updated address in cadd
        larp    0               select aux register 0
        b       ldm1            branch for next data input
*
*
*       read data memory routine
*
rdm     call    gword           call word input routine to get address
        lar     1,word          load address in aux. reg. 1
```

```
        larp    1               select aux reg. 1
        lac     *               read data memory location
        sacl    word            store data from memory location
        larp    0               select aux reg. 0
        call    sword           call send word routine
        b       charin          read next command
*
*
*       write to wdha routine
*
wwdha   call    gword           word input routine to get data for wdha
        lac     one,15          set wdha datain high for leading 1
        sacl    cadd            use cadd for working location
        out     cadd,6          clear wdha clocks to 0
        lac     one,15          set wdha datain high for leading 1
        add     one,14          set wdha clkin high
        sacl    cadd            store wdha output signals
        out     cadd,6          clock in leading 1
        zac                     clear accumulator
        sacl    cadd            low clock signals
        out     cadd,6          output low clock signals
        larp    1               select aux reg 0
        lark    1,15            store bit shift counter
wr0     lac     one,15          mask for data bit
        and     word            mask off high order bit
        sacl    cdata           store output data bit
        out     cdata,6         output data bit to wdha, clkin low
        lac     one,14          set clkin high
        or      cdata           add data bit
        sacl    cdata           store data bit, clkin high
        out     cdata,6         clock in data to wdha
        lac     word,1          shift data word
        sacl    word            store shifted output word
        banz    wr0             branch for next bit output
        larp    0               select aux. register 0
        b       charin          branch for next command
*
*       wdha read word routine
*
rwdha   zac                     clear accumulator
        sacl    word            clear input data word
        out     word,6          set clkout low
        larp    1               select aux reg 0
        lark    1,15            store bit shift counter
r0      lac     word,1          shift building input word
        sacl    word            store shifted word
        in      cdata,6         read dataout bit
        lac     cdata,1         shift data by 1 left
        sach    cdata           store new bit
        lac     one             set low order bit
        and     cdata           mask off new bit
        or      word            add bit to low order bit of word
        sacl    word            store word
        lac     one,13          set clkout bit
        sacl    cdata           store clkout bit
        out     cdata,6         set clkout high, generate leading edge
        zac                     clear accumulator
        sacl    cdata           clear clkout bit
        out     cdata,6         set clkout low
        banz    r0              branch until all bits read
        larp    0               select aux reg. 0
        call    sword           call word send routine
        b       charin          wait for next command
*
*       check wdha serial output bit
*
```

```
cwdha   in      cdata,6         read wdha serial output bit
        lac     one,15          mask for wdha serial bit
        and     cdata           check serial input bit
        bz      bitlow          branch if bit low
        lac     one             load one in accumulator
        sacl    word            store 0001 in output word
        b       cw0             branch to send word out
bitlow  zac                     clear accumulator
        sacl    word            store 0000 in output word
cw0     call    sword           call word send routine
        b       charin          wait for next command
*
*       word send routine (output word passed in word)
*
sword   lac     word,4          shift first nibble into upper accumulat
        sach    cdata           store nibble
        lack    15              4 low order bit mask
        and     cdata           mask nibble
        sacl    cdata           store nibble to be output
        call    sendch          call send character routine
        lac     word,8          shift second nibble into upper accumula
        sach    cdata           store nibble
        lack    15              4 low order bit mask
        and     cdata           mask nibble
        sacl    cdata           store nibble to be output
        call    sendch          call send character routine
        lac     word,12         shift third nibble into upper accumulat
        sach    cdata           store nibble
        lack    15              4 low order bit mask
        and     cdata           mask nibble
        sacl    cdata           store nibble to be output
        call    sendch          call send character routine
        lack    15              4 low order bit mask
        and     word            mask low order nibble
        sacl    cdata           store nibble to be output
        call    sendch          call send character routine
        ret                     return from sword
*
*       send character routine (output nibble in cdata)
*
sendch  larp    1               load auxiliary pointer to 1 for delay
        lack    9               load 9 in accumulator
        sub     cdata           check for chars 0-9
        blz     saf             branch if value A-F
        lack    48              base ascii offset for 0-9
        add     cdata           prepare ascii character
        sacl    cdata           store ascii code for 0-9
        b       sc0             branch to serial output processing
saf     lack    55              base ascii offset for A-F
        add     cdata           prepare ascii character
        sacl    cdata           store ascii code for A-F
        b       sc0             branch to serial output processing
delay   lark    1,40            delay counter for trans buffer to empty
del0    banz    del0            delay loop
        larp    0               select aux reg. 0
sc0     bioz    tbechk          check for pending input character
        b       charin          check for new command
tbechk  in      serin,1         read serial input register
        lac     one,10          mask for tbe bit
        and     serin           check tbe bit
        bz      delay           if buffer full branch to delay
        out     cdata,1         output character to UART
        ret                     return from sendch
*
*       word construct routine (results returned in word)
*
```

```
gword  call   getch          read bits 15-12
       lac    value          load input data value
       blz    charin         branch if invalid character received
       lac    value,12       load hex nibble in bits 15-12
       sacl   word           store building word
       call   getch          read bits 11-8
       lac    value          load input data value
       blz    charin         branch if invalid character received
       lac    value,8        load hex nibble in bits 11-8
       or     word           or with word
       sacl   word           store building word
       call   getch          read bits 7-4
       lac    value          load input data value
       blz    charin         branch if invalid character received
       lac    value,4        load hex nibble in bits 7-4
       or     word           or with word
       sacl   word           store building word
       call   getch          read bits 3-0
       lac    value          load input data value
       blz    charin         branch if invalid character received
       lac    value          load hex nibble in bits 3-0
       or     word           or with word
       sacl   word           store building word
       ret                   return from gword
*
*
*      serial input routine
*
*
getch  bioz   getch          wait for serial input
       larp   1              select aux reg 1
       lark   1,10           store delay counter
cwait  banz   cwait          wait for uart registers
       larp   0              select aux reg 0
*
       in     serin,1        read serial input register
*
*      check for '/' ([ESC])
*
       lack   >ff            load 8 bit low order mask
       and    serin          load input data into accumulator
       sacl   serin          store data only
       sacl   serout         store input data (prepare for echo)
       lack   47             load '/' ([ESC]) code in accumulator
       sub    serin          compare input
       bz     escin          branch if '/' ([ESC]) command character
*
*      check for 0-9 hex character
*
       lack   48             ascii code for 0
       sacl   temp           store ascii offset
       lac    serin          load serin in accumulator
       sub    temp           subtract offset for ascii 0
       blz    inerr          branch (<0) to invalid character routin
       sacl   serin          store shifted serin
       lack   9              ascii code offset for 9
       sacl   temp           store ascii offset
       lac    serin          load input data
       sub    temp           subtract 9
       bgz    not09          branch if serin > 9
       lac    serin          load value 0-9 in accumulator
       sacl   value          store input character value
       b      good           branch to character echo routine
*
*      check for A-F hex character
*
```

```
not09  lack   17           additional offset for A-F
       sacl   temp         store offset
       lac    serin        load input data
       sub    temp         subtract new offset
       blz    inerr        branch (<0) to invalid character routin
       sacl   serin        store shifted serin
       lack   5            ascii code offset
       sacl   temp         store ascii offset
       lac    serin        load input data
       sub    temp         subtract 5
       bgz    inerr        branch if serin > 5
       lack   10           load value for hex A
       add    serin        add input data
       sacl   value        store input character value
       b      good         branch to character echo routine

*
*      valid character echo
*
good   out    serout,1     output valid character
       ret                 return from character input

*
*      invalid character echo
*
inerr  lack   33           ascii code for !
       sacl   serout       store character to be echoed
       out    serout,1     output character
       zac                 clear accumulator
       sub    one          -1 in accumulator
       sacl   value        store -1 in value
       ret                 return from character input

*
*      '/' character echo
*
escin  out    serout,1     output '/' character
       pop                 clear return address
       b      comman       branch to command interpretation

*
*
bell   larp   1            select aux reg. 1
       lark   1,127        store delay counter
waitb  banz   waitb        wait for uart registers
       larp   0            select aux reg. 0

*
       bioz   bell2        branch if no pending character
       b      charin       branch to serial input handler
bell2  in     serin,1      read serial input register
       lac    one,10       mask for the bit
       and    serin        check the bit
       bz     bell         if buffer full branch to bell

*
       lack   7            ascii bell in accumulator
       sacl   serout       store bell character
       out    serout,1     send bell character
       b      bell         send another bell

*
*
       end
<
```

What is claimed is:

1. A noise reduction circuit for a sound reproduction system having a microphone for producing an input signal in response to sound in which a noise component is present, said circuit comprising:

an adaptive filter including a variable filter responsive to the input signal for producing a noise-estimating signal and further including a first combining means responsive to the input signal and the noise-estimating signal for producing a composite signal;

said variable filter having parameters which are varied in response to the composite signal to change the operating characteristics thereof;

a second filter for filtering the noise-estimating signal to produce a filtered noise-estimating signal;

means for delaying the input signal to produce a delayed signal; and second combining means for combining the delayed signal and the filtered noise-estimating signal to attenuate noise components in the delayed signal and for producing a noise-reduced output signal.

2. The circuit of claim 1 wherein the variable filter comprises means for sampling a percentage of the input signal to produce the noise-estimating signal which is a function of the noise components during said time intervals.

3. The circuit of claim 1 or 2 wherein the input signal is a digital signal; wherein the delaying means comprises means for delaying the input signal by an integer number of samples N to produce the delayed signal; and wherein the second filter comprises a symmetric FIR filter having a tap length of 2N+1 samples.

4. The circuit of claim 1 or 2 further comprising means for adjusting the amplitude of the filtered noise-estimating signal to produce an amplitude adjusted signal, and wherein the second combining means is responsive to the delayed input signal and the amplitude adjusted signal.

5. The circuit of claim 4 wherein the input signal is a digital signal and wherein the circuit further comprises means for delaying the input signal by a preset number of samples to produce a preset delayed signal; and wherein the variable filter is responsive to the preset delayed signal to produce the noise-estimating signal.

6. The circuit of claim 1 or 2 wherein the first combining means comprises means for taking the difference between the input signal and the noise-estimating signal and wherein the second combining means comprises means for taking the difference between the. delayed input signal and the filtered noise-estimating signal.

7. The circuit of claim 1 or 2 wherein the input signal is a digital signal and wherein the circuit further comprises means for delaying the input signal by a preset number of samples to produce a preset delayed signal, and wherein the variable filter is responsive to the preset delayed signal to produce the noise-estimating signal.

8. The circuit of claim 1 or 2 wherein the sound reproduction system is a hearing aid for use by the hearing impaired and wherein the second filter has filter parameters which are selected as a function of a user's hearing impairment.

9. The circuit of claim 1 or 2 wherein the second filter has filter parameters which are selected as a function of expected noise components.

10. A sound reproduction system comprising:

a microphone for producing an input signal in response to sound in which noise components are present;

a variable filter responsive to the input signal to produce a noise-estimating signal;

a first combining means responsive to the input signal and the noise-estimating signal for producing a composite signal;

said variable filter having parameters which are varied in response to the composite signal to change the operating characteristics thereof;

a second filter for filtering the noise-estimating signal to produce a filtered noise-estimating signal;

means for delaying the input signal to produce a delayed signal;

second combining means for combining the delayed signal and the filtered noise-estimating signal to attenuate noise components in the delayed signal and for producing a noise-reduced output signal; and a transducer for producing sound with a reduced level of noise components as a function of the noise-reduced output signal.

11. The system of claim 10 wherein the variable filter comprises means for sampling a percentage of the input signal to produce the noise-estimating signal which is a function of the noise component during said time intervals.

12. The system of claim 10 or 11 wherein the input signal is a digital signal; wherein the delaying means comprises means for delaying the input signal by an integer number of samples N to produce the delayed signal; and wherein the second filter comprises a symmetric FIR filter having a tap length of 2N+1 samples.

13. The system of claim 10 or 11 further comprising means for adjusting the amplitude of the filtered noise-estimating signal to produce an amplitude adjusted signal, and wherein tile second combining means is responsive to the delayed input signal and the amplitude adjusted signal.

14. The system of claim 13 wherein the input signal is a digital signal and wherein the system further comprises means for delaying the input signal by one sample to produce a predetermined delayed signal; and wherein the variable filter is responsive to the predetermined delayed signal to produce the noise-estimating signal.

15. The system of claim 10 or 11 wherein the first combining means comprises means for taking the difference between tile input signal and the noise-estimating signal and wherein the second combining means comprises means for taking the difference between the delayed input signal and the filtered noise-estimating signal.

16. The system of claim 10 or 11 wherein the input signal is a digital signal and wherein the system further comprises means for delaying the input signal by one sample to produce a predetermined delayed signal; and wherein the variable filter is responsive to the predetermined delayed signal to produce the noise-estimating signal.

17. The system of claim 10 or 11 wherein the sound reproduction system is a hearing aid for use by the hearing impaired and wherein the second filter has filter parameters which are selected as function of a user's hearing impairment.

18. The system of claim 10 or 11 wherein the second filter has filter parameters which are selected as a function of expected noise components.

19. A method of reducing noise components present in an input signal in the audible frequency range comprising the steps of:

filtering the input signal with a variable filter to produce a noise-estimating signal;

combining the input signal and the noise-estimating signal to produce a composite signal;

varying the parameters of the variable filter in response to the composite signal;

filtering the noise-estimating signal according to predetermined parameters to produce a filtered noise-estimating signal;

delaying the input signal to produce a delayed signal; and combining the delayed signal and the filtered noise-estimating signal to attenuate noise components in the delayed signal to produce a noise-reduced output signal.

20. The method of claim 19 wherein the filter parameter varying step comprises the step of continually sampling the input signal and varying the parameters of said variable filter during predetermined time intervals, whereby said variable filter produces the noise-estimating signal which is a function of the noise components during said time intervals.

21. The method of claim 19 or 20 wherein the input signal is a digital signal; wherein the delaying step comprises delaying the input signal by an integer number of samples N to produce the delayed signal; and wherein the noise-estimating signal filtering step comprises filtering the noise-estimating signal with a symmetric FIR filter having a tap length of 2N+1 samples.

22. The method of claim 19 or 20 further comprising the step of selectively adjusting the amplitude of the filtered noise-estimating signal to produce an amplitude-adjusted signal, and wherein the second stated combining step comprises combining the delayed signal and the amplitude-adjusted signal.

23. The method of claim 22 wherein the input signal is a digital signal and wherein the method further comprises the step of delaying the input signal by a predetermined number of samples to produce a predetermined delayed signal; and wherein the first stated filtering step comprises filtering the predetermined delayed signal to produce the noise-estimating signal.

24. The method of claim 19 or 20 wherein the first stated combining step comprises taking the difference between the input signal and the noise-estimating signal and wherein the second stated combining step comprises taking the difference between the delayed input signal and the filtered noise-estimating signal.

25. The method of claim 19 or 20 wherein the input signal is a digital signal and wherein the method further comprises the step of delaying the input signal by a predetermined number of samples to produce a predetermined delayed signal; and wherein the first stated filtering step comprises filtering the predetermined delayed signal to produce the noise-estimating signal.

26. The method of claim 19 or 20 as utilized in a sound reproduction system for use by the hearing impaired and wherein the noise-estimating signal filtering step comprises selecting the predetermined filter parameters as a function of a user's hearing impairment.

27. The method of claim 19 or 20 wherein the noise-estimating signal filtering step comprises selecting the predetermined filter parameters as a function of expected noise components.

28. The method of claim 22 wherein the step of adjusting the amplitude of the filtered noise-estimating signal comprises the step of making the adjustment as a function of the amplitude of the input signal.

29. The system of claim 10 or 11 further comprising a headband for a user's head and wherein the transducer is positioned on the headband adjacent the user's ear.

30. A hearing aid comprising:

a microphone for producing an input signal in response to sound in which noise components are present;

a variable filter responsive to the input signal to produce a noise-estimating signal;

a first combining means responsive to the input signal and the noise-estimating signal for producing a composite signal;

said variable filter having parameters which are varied in response to the composite signal to change the operating characteristics thereof;

a second filter for filtering the noise-estimating signal to produce a filtered noise-estimating signal;

means for delaying the input signal to produce a delayed signal;

second combining means for combining the delayed signal and the filtered noise-estimating signal to attenuate noise components in the delayed signal and for producing a noise-reduce output signal; and a transducer for producing sound with a reduced level of noise components as a function of the noise-reduced output signal.

31. The hearing aid of claim 30 wherein the variable filter comprises means for sampling a percentage of the input signal to produce the noise-estimating signal which is a function of the noise components during said time intervals.

32. The hearing aid of claim 30 or 31 wherein the input signal is a digital signal; wherein the delaying means comprises means for delaying the input signal by an integer number of samples N to produce the delayed signal; and wherein the second filter comprises a symmetric FIR filter having a tap length of 2N+1 samples.

33. The hearing aid of claim 30 or 31 further comprising means for adjusting the amplitude of the filtered noise-estimating signal to produce an amplitude adjusted signal, and wherein the second combining means is responsive to the delayed input signal and the amplitude adjusted signal.

34. The hearing aid of claim 33 wherein the input signal is a digital signal and wherein the hearing aid further comprises means for delaying the input signal by one sample to produce a predetermined delayed signal; and wherein the variable filter is responsive to the predetermined delayed signal to produce the noise-estimating signal.

35. The hearing aid of claim 30 or 31 wherein the first combining means comprises means for taking the difference between the input signal and the noise-estimating signal and wherein the second combining means comprises means for taking the difference between the delayed input signal and the filtered noise-estimating signal.

36. The hearing aid of claim 30 or 31 wherein the input signal is a digital signal and wherein the hearing aid further comprises means for delaying the input signal by one sample to produce a predetermined delayed signal; and wherein the variable filter is responsive to the predetermined delayed signal to produce the noise-estimating signal.

37. The hearing aid of claim 30 or 31 for use by the hearing impaired and wherein the second filter has filter parameters which are selected as a function of a user's hearing impairment.

38. The hearing aid of claim 30 or 31 wherein the second filter has filter parameters which are selected as a function of expected noise components.

39. A noise reduction circuit for a sound reproduction system having a microphone for producing an input signal in response to sound in which a noise component is present, said circuit comprising:

an adaptive filter including a variable filter responsive to the input signal for producing a noise-estimating signal and further including a first combining means responsive to the input signal and the noise-estimating signal for producing a composite signal;

said variable filter having parameters which are varied in response to the composite signal to change the operating characteristics thereof;

means for adjusting the amplitude of the noise-estimating signal to produce an amplitude adjusted signal; and second combining means for combining the input signal and the amplitude adjusted signal to attenuate noise components in the input signal and for producing a noise-reduced output signal.

* * * * *